(12) United States Patent
Joanni et al.

(10) Patent No.: US 8,762,321 B2
(45) Date of Patent: Jun. 24, 2014

(54) METHOD, SYSTEM AND COMPUTER PROGRAM PRODUCT FOR AUTOMATIC GENERATION OF BAYESIAN NETWORKS FROM SYSTEM RELIABILITY MODELS

(75) Inventors: Andreas Joanni, Neusäβ (DE); Christof Kaukewitsch, München (DE)

(73) Assignee: Siemens Aktiengesellschaft, Munich (DE)

( * ) Notice: Subject to any disclaimer, the term of this patent is extended or adjusted under 35 U.S.C. 154(b) by 303 days.

(21) Appl. No.: 13/184,641

(22) Filed: Jul. 18, 2011

(65) Prior Publication Data

US 2013/0024417 A1 Jan. 24, 2013

(51) Int. Cl.
*G06F 17/00* (2006.01)

(52) U.S. Cl.
USPC .......................................................... 706/59

(58) Field of Classification Search
USPC .......................................................... 706/59
See application file for complete search history.

(56) References Cited

U.S. PATENT DOCUMENTS

2012/0166371 A1* 6/2012 Sweeney et al. ................ 706/14

OTHER PUBLICATIONS

S. Montani, L. Portinale, A. Bobbio, D. Codetta-Raiteri. Radyban: A tool for reliability analysis of dynamic fault trees through conversion into dynamic Bayesian networks, Reliability Engineering & System Safety, vol. 93, Issue 7, Jul. 2008, pp. 922-993.*
Lentz, S.T., "Reliability Modeling of Regional Cabled Observatories," Oceans 2007—Europe , vol., No., pp. 1,6, Jun. 18-21, 2007.*
Stefania Monatni, Luigi Portinale, Andrea Bobbio, Daniele Codetta-Raiteri. DBNet, a tool to convert Dynamic Fault Trees into Dynamic Bayesian Networks. Universita degli Studi del Piemonte Orientale. Technical Report TR-INF-2005-08-02-fUNIPMN. Aug. 2005.*
Zandbergen, PF Th, et al. "A Bayesian network reliability software tool." (2008).*
Zhi-qiang Cai; Shu-dong Sun; Shu-bin Si; Ning Wang, "Modelling of failure prediction Bayesian network based on fault tree analysis," Industrial Engineering and Engineering Management (IE&EM), 2010 IEEE 17Th International Conference on , vol., No., pp. 937,941, Oct. 29-31, 2010.*
Hichem Boudali, Pepijn Crouzen, and Marielle Stoelinga. 2007. Dynamic Fault Tree Analysis Using Input/Output Interactive Markov Chains. In Proceedings of the 37th Annual IEEE/IFIP International Conference on Dependable Systems and Networks (DSN '07). IEEE Computer Society, Washington, DC, USA, 708-717.*
Beck, J. J and Au, S. (2002). "Bayesian Updating of Structural Models and Reliability using Markov Chain Monte Carlo Simulation." J. Eng. Mech., 128(4), 380-391.*
H. Boudali, J.B. Dugan, A discrete-time Bayesian network reliability modeling and analysis framework, Reliability Engineering & System Safety, vol. 87, Issue 3, Mar. 2005, pp. 337-349, ISSN 0951-8320, http://dx.doi.org/10.1016/j.ress.2004.06.004.*

* cited by examiner

*Primary Examiner* — Li-Wu Chang
*Assistant Examiner* — David H Kim
(74) *Attorney, Agent, or Firm* — King & Spalding L.L.P.

(57) ABSTRACT

A method, apparatus and computer program product for the conversion of at least one reliability model of a technical system to a Bayesian network model for assisting in the system's failure diagnostics, has the steps of creating a structure of a Bayesian network using information from at least one reliability model of the technical system, creating parameters of the Bayesian network using information from the reliability model of the technical system, the Bayesian network model having a plurality of observation nodes, obtaining information about the plurality of observation nodes from a list of observations that augments information contained in the reliability model of the technical system, and inserting the observation nodes into the created structure of the Bayesian network.

21 Claims, 3 Drawing Sheets

| Node1 | Initial_State | Intermediate_State A | Intermediate_State B | Failure_State |
|---|---|---|---|---|
| failed | 0.05 | 0.2 | 0.5 | 0.99 |
| passed | 0.95 | 0.8 | 0.5 | 0.01 |

Node properties: Observation

General   Definition   Format   User properties

Add   Insert

515

505 — System/Subsystem → Observation — 510

METHOD, SYSTEM AND COMPUTER PROGRAM PRODUCT FOR AUTOMATIC GENERATION OF BAYESIAN NETWORKS FROM SYSTEM RELIABILITY MODELS

TECHNICAL FIELD

The present invention relates generally to diagnostic support tools, and more particularly to a method, system and computer program product for generating a Bayesian network from a reliability model of a technical systems, for diagnostic support of the respective systems.

BACKGROUND

Reliability models such as fault trees, Markov models, or a combination thereof, are used for the graphical representation and the quantitative analysis of system failures.

Fault trees consist of nodes representing component failures and nodes representing functional failures of systems. They are connected by means of logic gates.

Markov models are stochastic models that assume the Markov property. Generally, this assumption enables reasoning and computation with the model that otherwise would not be possible. Markov modeling and analysis techniques offer applications in the time-based probability, reliability and availability analysis. For the graphical representation and quantitative analysis of system failures, a specific type of Markov models, called continuous-time Markov process may be used. The reliability behavior of a system is represented by a directed graph of states of the system. The system will remain in the current state for some random (in particular, exponentially distributed) amount of time and then transition to a different state. As such, Markov models consist of comprehensive representations of possible chains of events, i.e. transitions, within systems, which in the case of reliability and availability analysis correspond to sequences of failures and repair. The Markov model is analyzed in order to determine the amount of time a system is expected to spend in a given state.

Computing the solution of a Markov model is equivalent to computing the solution of a system of ordinary differential equations, which is done by integration.

A Markov analysis consists at least of three major steps: the specification of the states the system can be in; the specification of the rates at which transitions between states take place, and the computation of the solution to the model.

Fault trees can be regarded as specific embodiments of Markov models.

A fault tree for time-based probability, reliability and availability analysis of a system can be converted into an equivalent Markov model. The vice-versa conversion is generally not possible.

Bayesian networks (or belief networks) are a more general representation of the system. They can be used not only to compute the reliability of the system and to perform fault analysis, but also to assist in system diagnostics.

By exploiting the above referenced reliability models of technical systems such as Markov models, fault trees, and/or a combination of fault trees and Markov models containing embedded or separate reliability data, advanced high fidelity diagnostic tools based on Bayesian networks can be developed quickly and at low cost, without requiring an independent development effort. Currently such diagnostic products are typically not delivered on many systems, especially remote systems to which access is not easily gained, such as subsea applications because of the prohibitive cost.

There is thus a need in the art for a system that converts reliability models such as fault trees, Markov models, or a combination of Markov models and fault trees, automatically into the representation called a Bayesian network that enables a more efficient delivery of system diagnostics, allowing early and accurate detection of failures.

SUMMARY

According to an embodiment, a method of conversion of a reliability model of a technical system to a Bayesian network model for assisting in the technical system's failure diagnostics, may comprise the steps of: creating a structure of a Bayesian network using information from at least one reliability model of the technical system; creating parameters of the Bayesian network using information from the reliability model of the technical system; wherein said Bayesian network model comprises a plurality of observation nodes, obtaining information about said plurality of observation nodes from a list of observations that augments information contained in the reliability model of the technical system; and inserting the observation nodes into the created structure of the Bayesian network.

According to a further embodiment, said reliability model may comprise at least one of: Markov models, fault trees, a combination of Markov models with fault trees, and additional system information. According to a further embodiment, said technical system can be a subsea facility. According to a further embodiment, when said reliability model is a fault tree, the step of creating a structure of a Bayesian network may comprise the steps of: creating a node in the Bayesian network for each node in a fault tree; naming each node in the Bayesian network the same as a corresponding node in the fault tree; labeling each node in the Bayesian network with a unique identifier from the tree and creating the unique identifiers, if they are not available in the fault tree; assigning each Bayesian network node two states, one being a failure state and one being an OK state, and connecting the nodes in the Bayesian network with links as corresponding nodes in the fault tree are connected and wherein the direction of connections between the nodes is equivalent to the direction up the fault tree. According to a further embodiment, when said reliability model is a Markov model, the step of creating a structure of a Bayesian network may comprise the steps of: creating a node in the Bayesian network for each Markov model in the reliability model; naming each node in the Bayesian network the same as the corresponding Markov model, creating unique identifiers of the nodes, if they are not available; assigning to each Bayesian network node corresponding to a Markov model a number of states, one for each state from the corresponding Markov model; and naming said states as unique identifiers for the nodes of the Bayesian network. According to a further embodiment, the step of creating parameters of the Bayesian network may comprise the steps of: defining a prior probability of failure for each root node of the Bayesian network; building a plurality of conditional probability tables based upon the type of logic operations performed in the fault tree; and defining a plurality of conditional probabilities for each of the nodes in the Bayesian network that are not root nodes using corresponding conditional probability tables. According to a further embodiment, the step of creating parameters of the Bayesian network may comprise the step of: defining a plurality of prior probabilities of failure for each state of the node of the Bayesian network that corresponds to a Markov model. According to a further embodiment, the method may further comprise the step of pre-processing the reliability model into an intermediate format prior to conversion. According to a further embodiment, the pre-processing step may comprise syntax checking of the reliability model. According to a further embodiment, the pre-processing step may comprise including reliability values from a separate text document when the reliability model is in such format that requires it. According to a further embodiment, the method may further comprise the step of performing a system diagnostic procedure using the Bayesian network. According to a further embodiment, the method may further comprise the step of taking repair actions regarding the technical system based upon diagnostic recommendations resulting from the diagnostic procedure. According to a further embodiment, the method may further comprise the step of performing system failure analysis using the Bayesian network. According to a further embodiment, the method may further comprise the step of performing system reliability analysis using the Bayesian network. According to a further embodiment, the steps can be performed automatically.

According to another embodiment, a system for performing a diagnostic procedure may comprise: means for creating a structure of a Bayesian network using information from at least one reliability model of a technical system; means for creating parameters of the Bayesian network using information from the reliability model of a technical system operable for working in conjunction with the means for creating a structure of a Bayesian network; wherein said Bayesian network comprises a plurality of observation nodes; means for obtaining information about said plurality of observation nodes from a list of observations that augments information contained in the reliability model of the technical system, operable for working in conjunction with the means for creating a structure of a Bayesian network; and means for inserting the observation nodes into the Bayesian network operable for working in conjunction with the means for creating a structure of a Bayesian network.

According to a further embodiment of the system, when said reliability model is a fault tree, the means for creating a structure of a Bayesian network may comprise: means for creating a node in the Bayesian network for each node in the reliability model; means for naming each node in the Bayesian network the same as a corresponding node in the reliability model; means for labeling each node in the Bayesian network with a unique identifier from the reliability model, if available, and for creating the unique identifiers, if they are not available in the reliability model; means for assigning each Bayesian network node two states, one being a failure state and one being an OK state, and means for connecting the nodes in the Bayesian network with links as corresponding nodes in the reliability model are connected, wherein the direction of connections between the nodes is equivalent to the direction up the reliability model, and wherein all said means are in operable communication with a means for controlling operation of the system. According to a further embodiment of the system, when said reliability model is a Markov model, the means for creating a structure of a Bayesian network may comprise: means for creating a node in the Bayesian network for each Markov model in the reliability model; means for naming each node in the Bayesian network the same as the corresponding Markov model, and for creating unique identifiers of the nodes, if they are not available; means for assigning to each Bayesian network node corresponding to a Markov model a number of states, one for each state from the corresponding Markov model; and means for naming said states as unique identifiers for the nodes of the Bayesian network.

According to yet another embodiment, a computer program product may comprise: a tangible computer usable medium including a computer usable program code for performing conversion of a reliability model of a technical system to a Bayesian networks model for assisting in the system's failure diagnostics, the computer program code usable for: creating a structure of a Bayesian network using information from at least one reliability model of the technical system; creating parameters of the Bayesian network using information from the reliability model of the technical system; wherein said Bayesian network model comprises a plurality of observation nodes, obtaining information about said plurality of observation nodes from a list of observations that augments information contained in the reliability model of the technical system; and inserting the observation nodes into the created structure of the Bayesian network.

BRIEF DESCRIPTION OF THE DRAWINGS

The above and other aspects, features and advantages of the various embodiments will be more apparent from the following more particular description thereof, presented in conjunction with the following drawings wherein.

Corresponding reference characters indicate corresponding components throughout the several views of the drawings.

DETAILED DESCRIPTION

Figure 1:
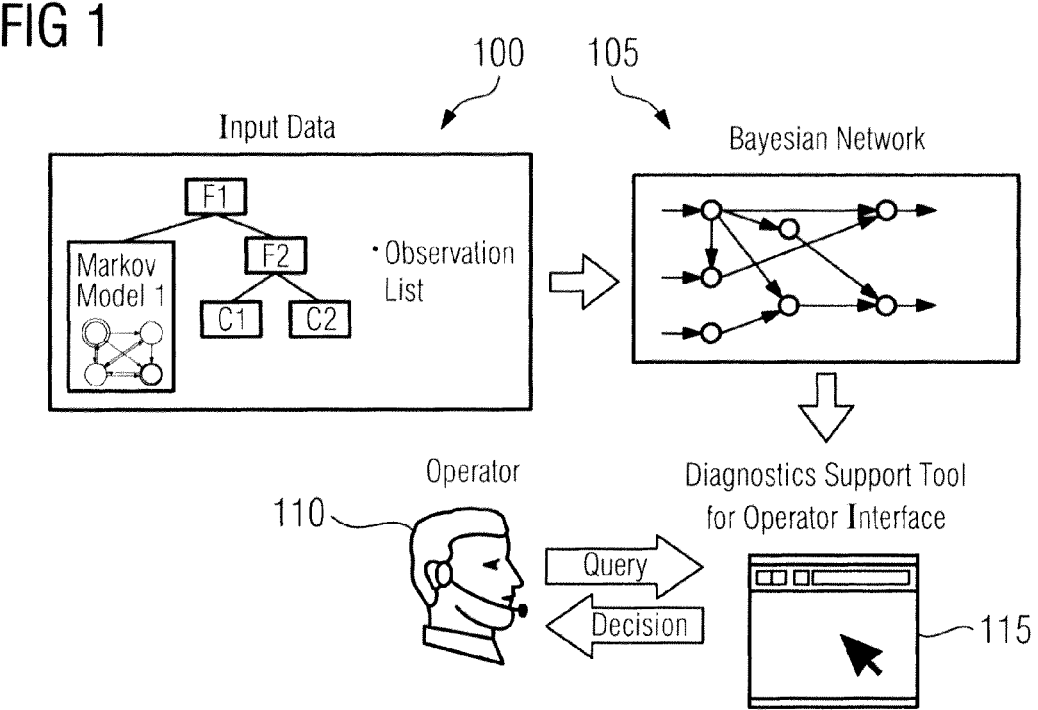
FIG. 1 is a diagram showing a high level view of an embodiment as a process for the design of a diagnostic support system. The special case of a Markov model as part of a fault tree is exemplarily depicted in FIG. 1.

According to various embodiments at least the above referenced problems of the art can be solved by providing for a method of conversion of a reliability model of a technical system to a Bayesian networks model for assisting in the system's failure diagnostics, comprising the steps of creating a structure of a Bayesian network using information from the at least one reliability model of the technical system, creating parameters of the Bayesian network using information from the reliability model, obtaining information about observation nodes for the Bayesian network from a list of observations that augments information contained in the reliability model, and inserting the observation nodes into the Bayesian network.

In accordance with the method, the reliability model comprises at least one of Markov models, fault trees, a combination of Markov models with fault trees, and additional system information. An exemplary technical system where the method may be applied is a subsea application.

In accordance with the method, the step of creating a structure of a Bayesian network comprises the steps of creating a node in the Bayesian network for each node in the fault tree, naming each node in the Bayesian network the same as a corresponding node in the fault tree;

labeling each node in the Bayesian network with a unique identifier from the tree if available, and creating the unique identifiers if they are not available in the fault tree, assigning to each Bayesian network node two states, one being a failure state and one being an OK state, connecting the nodes in the Bayesian network with links as corresponding nodes in the fault tree are connected and wherein the direction of connections between the nodes is equivalent to the direction up the fault tree. In an alternative embodiment the step of creating a structure of a Bayesian network comprises the steps of creating a node in the Bayesian network for each Markov model in the reliability model, naming each node in the Bayesian network the same as the corresponding Markov model if available, and creating the unique identifiers if they are not available, assigning to each Bayesian network node corresponding to a Markov model a number of states, one for each state from the corresponding Markov model, and naming them as unique identifiers for the states.

The step of creating parameters of the Bayesian network comprises defining prior probability of failure for each root node of the Bayesian network, building conditional probability tables based upon the type of logic operations performed in the fault tree, and defining conditional probabilities for each of the nodes in the Bayesian network that are not root nodes using corresponding conditional probability tables. Alternatively the step of creating parameters of the Bayesian network comprises defining prior probabilities of failure for each state of the node of the Bayesian network that corresponds to a Markov model.

The method according to various embodiments further comprises the step performing system failure diagnostics using the Bayesian network, the step of performing system reliability analysis using the Bayesian network, and the steps are performed automatically.

In accordance with the method proposed, a reliability model may be pre-processed into an intermediate format prior to conversion. The pre-processing step comprises syntax checking of the reliability model, including reliability values from a separate text document when the reliability model is in such format that requires it.

The method according to various embodiments further comprises the steps of performing a system diagnostic procedure using the Bayesian network, the step of taking repair actions based upon diagnostic recommendations resulting from the diagnostic procedure, and the step of performing system failure analysis using the Bayesian network.

The information about observation nodes is based on information provided regarding the subsea application, and the steps of the method are performed automatically.

Some embodiments are also directed to a system for performing a diagnostic procedure comprising means for creating a structure of a Bayesian network using information from at least one reliability model of a technical system, means for creating parameters of the Bayesian network using information from the reliability model of a technical system operable for working in conjunction with the means for creating a structure of a Bayesian network, means for obtaining information about observation nodes for the Bayesian network from a list of observations that augments information contained in the reliability model operable for working in conjunction with the means for creating a structure of a Bayesian network, and means for inserting the observation nodes into the Bayesian network operable for working in conjunction with the means for creating a structure of a Bayesian network.

Further, some embodiments are also directed to a computer program product comprising a tangible computer usable medium including a computer usable program code for performing conversion of at least one reliability model of a technical system to a Bayesian networks model for assisting in the system's failure diagnostics, the computer usable program code for creating a structure of a Bayesian network using information from at least one reliability model of the technical system, creating parameters of the Bayesian network using information from the reliability model, obtaining information about observation nodes for the Bayesian network from a list of observations that augments information contained in the reliability model, and inserting the observation nodes into the Bayesian network.

The following description of the presently contemplated best mode of practicing the invention is not to be taken in a limiting sense, but is made merely for the purpose of describing the general principles of the invention. The scope of the invention should be determined with reference to the claims.

If a technical system fails because one or more of its components have failed, then it is oftentimes not possible to identify which individual components have caused the failure of the technical system. This is the case if the individual components are not directly accessible or observable because they are inner parts of the technical system, or because the technical system itself is located in a remote location. In these cases presumptions regarding the state of the system may be made only indirectly through observations such as sensor signals, noise, visual impressions, regarding which individual components may have caused the failure of the technical system. In some cases the technical system is not directly accessible for observation, especially in systems located undersea or within the human body.

Referring to FIG. 1, FIG. 1 illustrates a high level view of the method according to various embodiments as a process for the design of a diagnostics support system. The special case of a reliability model consisting of a Markov model as part of a fault tree is exemplarily depicted in FIG. 1. The various embodiments are only exemplarily described in connection with the representation made in FIG. 1, wherein the reliability model consists of a Markov model as part of a fault tree. Other embodiments wherein the reliability model consist of only Markov models, only fault trees, and additional system information are also contemplated to be within the scope of the present invention.

Shown in FIG. 1 is a graphical representation of input data 100 that may comprise reliability models, consisting of Markov models, or a combination of fault trees and Markov models, of a technical system as well as a list of observations, a graphical representation of a diagnostic Bayesian network 105, a graphical representation of a technical system operator 110, and a graphical representation of a diagnostic support software tool and its graphical user interface 115. In the graphical representation of input data 100, the special case of a Markov model as a part of a fault tree is depicted as an example. Although the technical system operator 110 is represented in FIG. 1 via schematics indicating a human operation, the invention is not limited to this implementation, and may take the form of an automated operator system, a robot, or any other possible embodiment apparent for a person skilled in the art.

The diagnostic Bayesian network 105 is used as a basis for a diagnostics decision support tool 115 (that may exemplarily provide diagnosis regarding the functions of a subsea facility, a medical device within the human body, etc.). The tool 115 may be implemented as comprising a front-end graphical user interface (GUI), library of probabilistic calculation routines (not shown), and the Bayesian network 105. The GUI of the tool 115 is used for entry of user commands i.e. diagnostic queries by an operator 110 and for output of diagnostic recommendations from the tool 115. The Bayesian network 105 is updated using the states of known observations 100. The states of observations are obtained automatically from the data source, input data 100, or any other devices part of the technical system under diagnostic that provide information regarding the state of the system. The states of observations may also be obtained from a database, or technical manuals, or from expert sources. The Bayesian network 105 for diagnostics is created through conversion of the input data 100 represented as Markov models or a combination of fault trees and Markov models, as well as an observation list or their combination 100, associated with the technical system being diagnosed, to the Bayesian network 105.

It is of note that a fault tree for time-based probability, reliability and availability analysis of a system can always be converted into an equivalent Markov model. Therefore, a simplified representation made in regarding the input data 100 may comprise only a Markov model and an observation list, or only a Markov model characteristic for the system being diagnosed.

Figure 2:
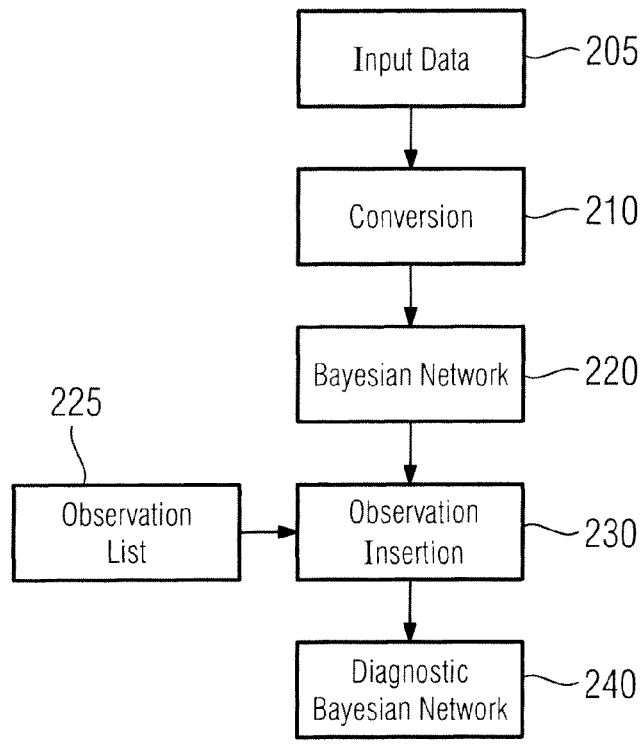
FIG. 2 is a diagram focusing on the Markov model to Bayesian network conversion and observation insertion steps of building the diagnostics support system of FIG. 1 according to various embodiments.

Referring to FIG. 2, FIG. 2 shows a diagram of conversion of reliability models comprising Markov models, or a combination of fault trees and Markov models, to a Bayesian network, and observation insertion steps for building the diagnostics support system represented in FIG. 1.

In FIG. 2 are represented blocks representing input data 205, that may comprise at least one reliability models such as Markov models, or a combination of fault trees and Markov models and a list of observations, an associated Bayesian network (Bayesian network) 220, an additional observation list 225, and a resulting diagnostic Bayesian network 240. Also shown are the steps of conversion 210 of the input data 205 into the Bayesian network 220 and observation insertion 230 into the Bayesian network 220.

First, the input data 205 is converted 210 to create the structure and parameters of the Bayesian network 220. Then in the second step, additional observation nodes are inserted 230 into the Bayesian network 220 previously created. Information about the observation nodes is obtained from the observation list 225 or from the input information, which may augment the information contained in the input data 205. This results in the diagnostic Bayesian network 240.

Figure 3:
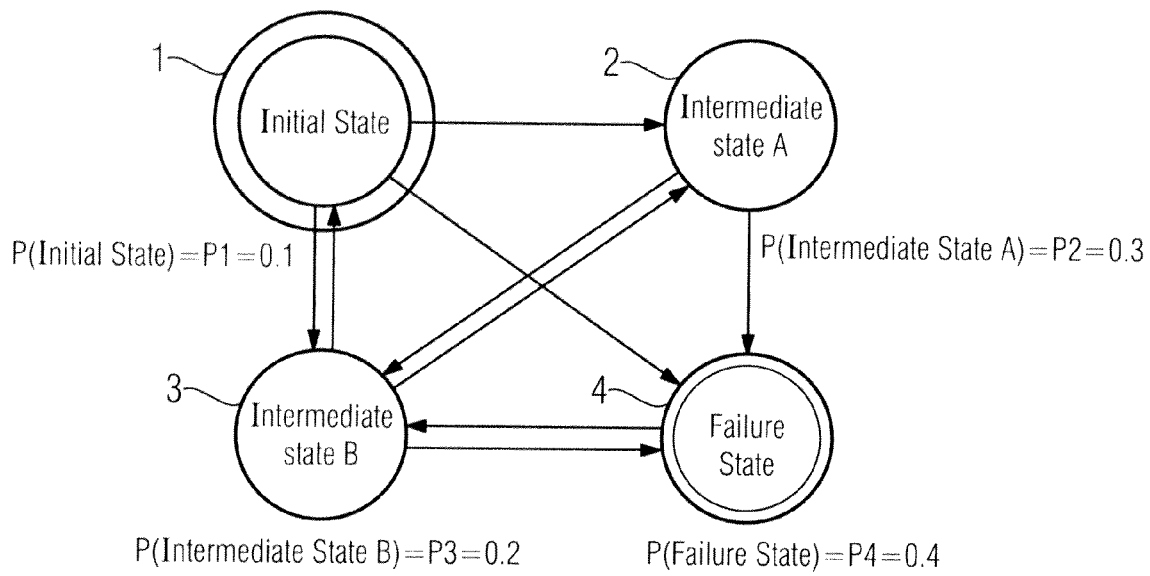
FIG. 3 is a diagram representing an exemplary Markov model to be converted to a Bayesian network according to an embodiment.

Referring now to the illustration of FIG. 3, FIG. 3 is a diagram representing an exemplary Markov model to be converted to a Bayesian network according to an embodiment.

Shown in FIG. 3 is a directed graph of states of the system or subsystem, where state 1 represents the initial state, i.e. the state where the system or subsystem is without any failures of its individual components. States 2 and 3 represent the situation where some of the components may have failed, but the system or subsystem as a whole is still in a functioning state. State 4 represents the failure state of the system or subsystem as a whole. The directed links between the states indicate transition from one state to another, which may represent failures of one or more of the components that form the system or subsystem, repair actions, and others.

Also illustrated in FIG. 3 are the probabilities P1, P2, P3 and P4, which represent the probabilities that the system or subsystem is in state 1, 2, 3, and 4, respectively. These probabilities are obtained by analyzing the Markov model with an appropriate analysis tool. These probabilities may represent the steady-state probabilities, or probabilities for a fixed time horizon, at which the analysis is carried out.

Figure 4:
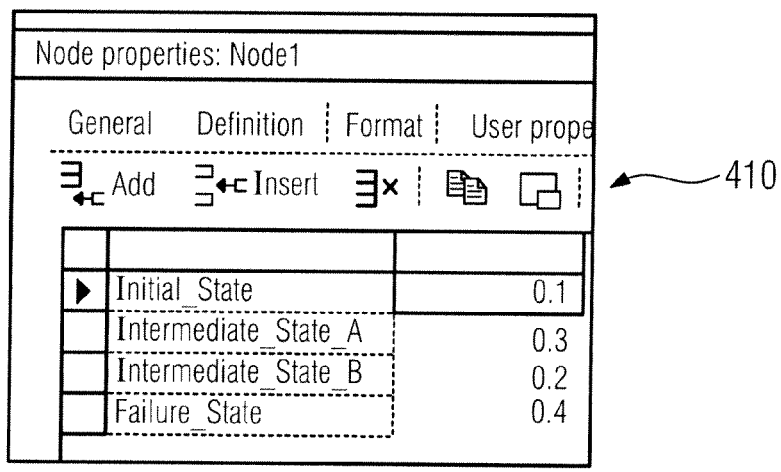
FIG. 4 is a diagram of what the Markov model of FIG. 3 looks like after the first step of converting it to a Bayesian network according to an embodiment.
Figure 4:
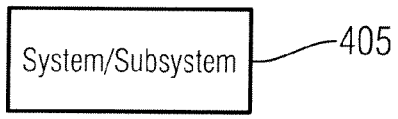

Referring now to FIG. 4, FIG. 4 is a diagram of what the Markov model of FIG. 3 looks like after the first step of converting it to a Bayesian network, according to an embodiment.

Shown in FIG. 4 is a single Bayesian network node representing the system or subsystem 405 which is modeled by the Markov model of FIG. 3.

In the present embodiment, the following formal assumptions have been made: the reliability models employed to convey information regarding the technical systems consist only of a Markov model. As mentioned before, it is within the scope of the present invention to use one or more reliability models to describe the technical system that may comprise Markov models, fault trees, as well as a combination of Markov models and fault trees, observation lists, or any combination between the above. Further, since a fault tree for the time-based probability, reliability and availability analysis of a technical system can always be converted into an equivalent Markov model, the explanation provided in the following in connection with the embodiments where the reliability model comprises only Markov models is identically applicable as well to the embodiments where the reliability model comprises both Markov models and fault trees, in combination with other information.

In the following, an algorithm will be described for obtaining a Bayesian network structure from a Markov model, according to an embodiment. As shown in FIG. 4, the Bayesian network structure consists of a single node 405. For each Markov model of the reliability model of the technical system, a node in the Bayesian network is created. As a label of the node in the Bayesian network structure a unique identifier available from the Markov models is used. If there are no unique identifiers available from the Markov models, the identifiers may be created. To each Bayesian network node that represents a Markov model, a number of states are assigned that correspond to the states of the respective Markov model.

Also shown in FIG. 4 is a screenshot of a graphical user interface containing a probability table 410 associated with the Bayesian network node 405.

All the nodes of the Bayesian network that represent Markov models require probability tables 410, as it is represented in FIG. 4. The probability table is obtained from the states of the respective Markov model represented in FIG. 3, as well as the state probabilities of FIG. 3.

The parameters of the Bayesian network structure are probabilities. They must be defined for each state of each of the nodes. As already mentioned above, if the prior probability is not available, then these probabilities are obtained by analyzing the Markov model with an appropriate analysis tool. These probabilities may represent the steady-state probabilities, or probabilities for a fixed time horizon, at which the analysis is carried out.

Figure 5:
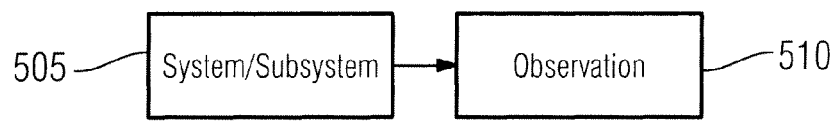
FIG. 5 is the Bayesian network of FIG. 4 after insertion of an observation node to identify defective states of the technical system (the next step in creating the Bayesian network).

Referring next to FIG. 5, shown in the figure is the Bayesian network of FIG. 4 after insertion of an observation node to identify the present state of the system or subsystem.

In the figure are shown nodes representing a system or subsystem 505, and an observation node 510.

It is desirable to identify the state of the system or subsystem using results of the performed observations. To apply the Bayesian network to this type of diagnostics, it is necessary to add the network nodes 510 representing the observations. The new Bayesian network structure of FIG. 5 is obtained from the Bayesian network of FIG. 4 and from a list of observations. The content of the list of observations and the algorithm used for insertion of the observations into the Bayesian network are described below.

The following information is to be provided in the list of observations. The names of the observations and the names of their results (e.g., fail, pass) are to be provided. For each one observation, the names of systems or subsystems must be provided. These are observed by the observation, (i.e. names of nodes representing the Markov models).

For each of the observations and for each of the systems or subsystems, which are observed by observation, the probability of producing the observation's results as a result of a state of the system or subsystem is provided. For each of the observations from the list a new observation node 510 in the Bayesian network is created. The node will have a name which is identical to the observation name. It will have a separate state for each of the possible observation results. For each observation node in the Bayesian network, links are provided connecting it with all system or subsystem nodes 505 in the Bayesian network, which are observed by the observation, as indicated in the list. The links are directed from the system or subsystem node 505 to the observation nodes 510.

Also shown in FIG. 5 is a screenshot of a graphical user interface of a Bayesian network editor containing a conditional probability table 515 associated with the observation node 510, according to an embodiment.

For each of the observation nodes in the Bayesian network a conditional probability table 515 is created using the probability of producing the observation results, which is provided in the list 225. The conditional probability table 515 contains one column for each observed state of the system or subsystem. In each column at the row for "failed" state of the observation one enters the probability of the failure of the observation given the state of the system or subsystem contained in the observation list 225. Examples of such observations are provided by subsea facility observation points. Yet other examples of such observations are measurements performed during medical procedures. The Bayesian network with the observations inserted becomes a diagnostic Bayesian network 240.

It is important to note that the present invention is not limited in scope to accepting only the Markov model formats created by a particular software program. Different Bayesian network editing tools can be used to open the Bayesian network, examine it, modify and possibly perform queries on them. The software may also be extended to other formats of Bayesian networks as well.

As a decision support tool for diagnosis of a system the diagnostic Bayesian network 240 can be used as a basis for diagnostic recommendations. The diagnostic recommendations are obtained by means of probabilistic calculations performed on the updated Bayesian network. Probability $p(x_i)$ of a defect is computed for each component $x_i$ from a joint probability distribution $p(x_1, x_2, x_3, \ldots x_n)$ over all components and observations. The joint probability may be computed using a chain rule:

$$p(x_1, x_2, x_3, \ldots, x_n) = \prod_{i=1}^{n} p(x_i | x_1, \ldots, x_{i-1})$$

In a typical Bayesian network a set of variables $S_i$ on which the variable x depends conditionally is only a small subset of the variables listed on the right hand side of the general chain rule.

Thus, the following holds:

$$p(x_i | x_i, \ldots, x_{i-1}) = p(x_i | S_i)$$

Therefore the joint probability for the Bayesian network can be obtained using a simpler computation:

$$p(x_1, x_2, x_3 | \ldots, x_n) = \prod_{i=1}^{n} p(x_i | s_i)$$

The formulas are part of the library of probabilistic routines used in the diagnostic decision support tool 115.

As discussed above, via the methods and means according to various embodiments, the automatic conversion is demonstrated for Markov Models. Hence, with the help of various embodiments, reliability models that consist of Markov models alone, or a combination of Markov models and fault trees, can be converted into Bayesian networks. As a result, the range of application of reliability models can be extended and the range of reliability models that can be converted is also extended. As a result, the various embodiments propose improved methods and means assisting in system reliability, failure analysis and diagnostics. As discussed above, this is facilitated by using information from the Markov model (and possibly fault tree) structure to create the Bayesian network structure, creating parameters and so on. Moreover, the procedure for adding observation nodes is essentially the same.

Various embodiments, via the utilization of reliability information and system structure from reliability models allows the derivation of the structure for the Bayesian network model as well as the derivation of a priori probabilities for nodes corresponding to component failures. Therefore, various embodiments exhibits the following advantages:

Due to the characteristic features of the reliability models employed, they are well suited for deriving the basic structure and the a priori probabilities for nodes corresponding to failures for the Bayesian network model. Further, various embodiments may be easily applicable since reliability models already exist for the technical systems. The conversion from the reliability model to a Bayesian network model may be performed in an automated step, and as a result the modeling effort is significantly reduced.

In summary, various embodiments are directed to a method, a system and a computer program product of conversion of a technical system reliability model for assisting in system reliability, failure analysis and diagnostics, comprising the steps of creating a structure of a Bayesian network using information from the reliability model, creating the parameters of the Bayesian network using information from the reliability model, obtaining information about observation nodes for the Bayesian network from a list of observations that augments information contained in the reliability model, and inserting the observation nodes into the Bayesian network.

In a particular embodiment, the method is directed to the conversion of a subsea facility reliability model that includes Markov models to Bayesian networks for assisting in system reliability, failure analysis and diagnostics.

It is of note that a fault tree cannot generally be obtained by conversion of a Markov model, but the conversion of a Markov model t a fault tree is possible.

In accordance with the method, if the reliability model comprises a fault tree, the step of creating a structure of a Bayesian network comprises the steps of: creating a node in the Bayesian network for each node in the fault tree, naming each node in the Bayesian network the same as a corresponding node in the fault tree, labeling each node in the Bayesian network with a unique identifier from the tree if available, and creating the unique identifiers if they are not available in the fault tree; assigning to each Bayesian network node two states, one being a failure state and one being an OK state, connecting the nodes in the Bayesian network with links as corresponding nodes in the fault tree are connected, and wherein the direction of connections between the nodes is equivalent to the direction up the fault tree.

In accordance with the method, when the reliability model comprises Markov models, the step of creating a structure of a Bayesian network comprises the steps of creating a node in the Bayesian network for each Markov model in the reliability model, naming each node in the Bayesian network the same as the corresponding Markov model if available, and creating the unique identifiers if they are not available, assigning to each Bayesian network node corresponding to a Markov model a number of states, one for each state from the corresponding Markov model; and naming them using unique identifiers of the states.

Finally, in order to create a structure of a Bayesian network based on a reliability model that consists of several Markov models, or a combination of one or more Markov models and fault trees, the nodes in the Bayesian network for each Markov model in the reliability model must be connected in the same way as the individual nodes from a fault tree.

In accordance with the method according to various embodiments the step of creating parameters of the Bayesian network comprises the steps of defining a prior probability of failure for each root node of the Bayesian network, building conditional probability tables based upon the type of logic operations performed in the fault tree, and defining conditional probabilities for each of the nodes in the Bayesian network that are not root nodes using corresponding conditional probability tables.

Should the method be applied regarding a reliability model that comprises Markov models, the step of creating parameters of the Bayesian network comprises in addition to the above the step of defining prior probability of failure for each state of the node of the Bayesian network that corresponds to a Markov model.

Optionally, the various embodiments may further comprise the step of pre-processing the reliability model into an intermediate format prior to conversion. The pre-processing step comprises syntax checking of the reliability model. The pre-processing step comprises including reliability values from a separate text document when the reliability model is in such format that it requires it.

The various embodiments also propose a system for performing diagnostic procedures comprising:
means for creating a structure of a Bayesian network using information from a reliability model of a technical system,
means for creating parameters of the Bayesian network using information from the reliability model operable for working in conjunction with the means for creating a structure of a Bayesian network;
means for obtaining information about observation nodes for the Bayesian network from a list of observations that augments information contained in the reliability model operable for working in conjunction with the means for creating a structure of a Bayesian network, and
means for inserting the observation nodes into the Bayesian network operable for working in conjunction with the means for creating a structure of a Bayesian network.

The various embodiments also propose a Computer Program Product comprising a tangible computer usable medium including a computer usable program code for performing conversion of a reliability model of a technical system to a Bayesian networks model for assisting in the system's failure diagnostics, the computer usable program code for creating a structure of a Bayesian network using information from at least one reliability model of the technical system, creating parameters of the Bayesian network using information from the reliability model, obtaining information about observation nodes for the Bayesian network from a list of observations that augments information contained in the reliability model, and inserting the observation nodes into the Bayesian network.

While the invention herein disclosed has been described by means of specific embodiments and applications thereof, numerous modifications and variations could be made thereto by those skilled in the art without departing from the scope of the invention set forth in the claims.

What is claimed is:

1. A method of conversion of a reliability model of a technical system to a Bayesian network model for assisting in the technical system's failure diagnostics, comprising the steps of:
creating a structure of a Bayesian network using information from at least one reliability model of the technical system defining multiple states, including converting each reliability model into an individual node of the Beyesian network;
creating parameters of the Bayesian network using information from the reliability model of the technical system; and
creating a diagnostic Bayesian network based on the Bayesian network and a list of observations by:
for at least one individual node of the Beyesian network corresponding to a converted reliability model of the technical system, accessing a list of observations that augments information contained in the respective reliability model of the technical system, the list of observations defining an observed probability of failure for each of the multiple states of the respective reliability model; and
generating an observation node based on the accessed list of observations, and
inserting the generated observation node into the created structure of the Bayesian network by linking the observation node to one or more other nodes of the Bayesian network.

2. The method according to claim 1, wherein said reliability model comprises at least one of: Markov models, fault trees, a combination of Markov models with fault trees, and additional system information.

3. The method according to claim 1, wherein said technical system is a subsea facility.

4. The method according to claim 1, wherein, when said reliability model is a fault tree, the step of creating a structure of a Bayesian network comprises the steps of:
creating a node in the Bayesian network for each node in a fault tree;
naming each node in the Bayesian network the same as a corresponding node in the fault tree;
labeling each node in the Bayesian network with a unique identifier from the tree and
creating the unique identifiers, if they are not available in the fault tree;
assigning each Bayesian network node two states, one being a failure state and one being an OK state, and
connecting the nodes in the Bayesian network with links as corresponding nodes in the fault tree are connected and wherein the direction of connections between the nodes is equivalent to the direction up the fault tree.

5. The method according to claim 1, wherein, when said reliability model is a Markov model, the step of creating a structure of a Bayesian network comprises the steps of:
creating a node in the Bayesian network for each Markov model in the reliability model;
naming each node in the Bayesian network the same as the corresponding Markov model,
creating unique identifiers of the nodes, if they are not available;
assigning to each Bayesian network node corresponding to a Markov model a number of states, one for each state from the corresponding Markov model; and naming said states as unique identifiers for the nodes of the Bayesian network.

6. The method according to claim 1, wherein the step of creating parameters of the Bayesian network comprises the steps of:
defining a prior probability of failure for each root node of the Bayesian network;
building a plurality of conditional probability tables based upon the type of logic operations performed in the fault tree; and
defining a plurality of conditional probabilities for each of the nodes in the Bayesian network that are not root nodes using corresponding conditional probability tables.

7. The method according to claim 1, wherein the step of creating parameters of the Bayesian network comprises the step of:
defining a plurality of prior probabilities of failure for each state of the node of the Bayesian network that corresponds to a Markov model.

8. The method according to claim 1, further comprising the step of pre-processing the reliability model into an intermediate format prior to conversion.

9. The method according to claim 8, wherein pre-processing step comprises syntax checking of the reliability model.

10. The method according to claim 8, wherein the pre-processing step comprises including reliability values from a separate text document when the reliability model is in such format that requires it.

11. The method according to claim 1, further comprising the step of performing a system diagnostic procedure using the Bayesian network.

12. The method according to claim 1, further comprising the step of taking repair actions regarding the technical system based upon diagnostic recommendations resulting from the diagnostic procedure.

13. The method according to claim 1, further comprising the step of performing system failure analysis using the Bayesian network.

14. The method according to claim 1, further comprising the step of performing system reliability analysis using the Bayesian network.

15. The method according to claim 1 wherein the steps are performed automatically.

16. A system for performing a diagnostic procedure comprising:
means for creating a structure of a Bayesian network using information from at least one reliability model of a technical system defining multiple states, including converting each reliability model into an individual node of the Beyesian network;
means for creating parameters of the Bayesian network using information from the reliability model of a technical system operable for working in conjunction with the means for creating a structure of a Bayesian network; and
means for creating a diagnostic Bayesian network based on the Bayesian network and a list of observations by:
for at least one individual node of the Beyesian network corresponding to a converted reliability model of the technical system, accessing a list of observations that augments information contained in the respective reliability model of the technical system, the list of observations defining an observed probability of failure for each of the multiple states of the respective reliability model; and
generating an observation node based on the accessed list of observations, and
inserting the generated observation node into the created structure of the Bayesian network by linking the observation node to one or more other nodes of the Bayesian network.

17. The system according to claim 16, wherein when said reliability model is a fault tree, the means for creating a structure of a Bayesian network comprises:
means for creating a node in the Bayesian network for each node in the reliability model;
means for naming each node in the Bayesian network the same as a corresponding node in the reliability model;
means for labeling each node in the Bayesian network with a unique identifier from the reliability model, if available, and for creating the unique identifiers, if they are not available in the reliability model;
means for assigning each Bayesian network node two states, one being a failure state and one being an OK state, and
means for connecting the nodes in the Bayesian network with links as corresponding nodes in the reliability model are connected,
wherein the direction of connections between the nodes is equivalent to the direction up the reliability model, and
wherein all said means are in operable communication with a means for controlling operation of the system.

18. The system according to claim 16, wherein when said reliability model is a Markov model, the means for creating a structure of a Bayesian network comprises:
means for creating a node in the Bayesian network for each Markov model in the reliability model;
means for naming each node in the Bayesian network the same as the corresponding Markov model, and for
creating unique identifiers of the nodes, if they are not available;
means for assigning to each Bayesian network node corresponding to a Markov model a number of states, one for each state from the corresponding Markov model; and
means for naming said states as unique identifiers for the nodes of the Bayesian network.

19. A Computer Program Product comprising:
a tangible computer usable medium including a non-transitory computer usable program code for performing conversion of a reliability model of a technical system to a Bayesian networks model for assisting in the system's failure diagnostics, wherein the computer program code when executed on a computer provides for:
creating a structure of a Bayesian network using information from at least one reliability model of the technical system defining multiple states, including converting each reliability model into an individual node of the Beyesian network;
creating parameters of the Bayesian network using information from the reliability model of the technical system; and
creating a diagnostic Bayesian network based on the Bayesian network and a list of observations by:
for at least one individual node of the Beyesian network corresponding to a converted reliability model of the technical system, accessing a list of observations that augments information contained in the respective reliability model of the technical system, the list of observations defining an observed probability of failure for each of the multiple states of the respective reliability model; and
generating an observation node based on the accessed list of observations, and inserting the generated observation node into the created structure of the Bayesian network by linking the observation node to one or more other nodes of the Bayesian network, generating an observation node based on the accessed list of observations, and inserting the generated observation node into the created structure of the Bayesian network by linking the observation node to one or more other nodes of the Bayesian network.

20. A method of conversion of a reliability model of a technical system to a Bayesian network model for assisting in the technical system's failure diagnostics, comprising:

creating a structure of a Bayesian network using information from at least one reliability model of the technical system;

creating parameters of the Bayesian network using information from the reliability model of the technical system;

wherein said Bayesian network model comprises a plurality of observation nodes, obtaining information about said plurality of observation nodes from a list of observations that augments information contained in the reliability model of the technical system; and inserting the observation nodes into the created structure of the Bayesian network;

wherein, when said reliability model is a Markov model, the step of creating a structure of a Bayesian network comprises:

creating a node in the Bayesian network for each Markov model in the reliability model;

naming each node in the Bayesian network the same as the corresponding Markov model, creating unique identifiers of the nodes, if they are not available;

assigning to each Bayesian network node corresponding to a Markov model a number of states, one for each state from the corresponding Markov model; and naming said states as unique identifiers for the nodes of the Bayesian network.

21. A system for performing a diagnostic procedure comprising:

means for creating a structure of a Bayesian network using information from at least one reliability model of a technical system;

means for creating parameters of the Bayesian network using information from the reliability model of a technical system operable for working in conjunction with the means for creating a structure of a Bayesian network;

wherein said Bayesian network comprises a plurality of observation nodes;

means for obtaining information about said plurality of observation nodes from a list of observations that augments information contained in the reliability model of the technical system, operable for working in conjunction with the means for creating a structure of a Bayesian network; and means for inserting the observation nodes into the Bayesian network operable for working in conjunction with the means for creating a structure of a Bayesian network;

wherein when said reliability model is a Markov model, the means for creating a structure of a Bayesian network comprises:

means for creating a node in the Bayesian network for each Markov model in the reliability model;

means for naming each node in the Bayesian network the same as the corresponding Markov model, and for creating unique identifiers of the nodes, if they are not available;

means for assigning to each Bayesian network node corresponding to a Markov model a number of states, one for each state from the corresponding Markov model; and means for naming said states as unique identifiers for the nodes of the Bayesian network.

* * * * *